United States Patent [19]

Craft

[11] 3,710,348

[45] Jan. 9, 1973

[54] CONNECT MODULES

[75] Inventor: David J. Craft, Chandler's Ford, England

[73] Assignee: International Business Machines Corporation, Armonk, N.Y.

[22] Filed: March 24, 1971

[21] Appl. No.: 127,487

[30] Foreign Application Priority Data

April 2, 1970 Great Britain....................15,553/70

[52] U.S. Cl.................................340/172.5, 340/147

[51] Int. Cl...............................................G06f 13/00

[58] Field of Search......340/147, 150, 166, 167, 248, 340/172.5

[56] References Cited

UNITED STATES PATENTS

| | | | |
|---|---|---|---|
| 3,470,542 | 9/1969 | Trantanella | 340/150 |
| 3,231,863 | 1/1966 | Ulfsparre | 340/172.5 |
| 3,327,102 | 6/1967 | Truitt et al. | 340/172.5 |
| 3,243,582 | 3/1966 | Holst | 340/172.5 |
| 3,290,656 | 12/1966 | Lindquist | 340/172.5 |
| 3,287,703 | 11/1966 | Slotnick | 340/172.5 |
| 3,200,380 | 8/1965 | MacDonald et al. | 340/150 |

*Primary Examiner*—Gareth D. Shaw
*Attorney*—Hanifin & Jancin and John C. Black

[57] ABSTRACT

A connect module (carried by a single structure with control and data input-output pins) interfaces between functional memory stores and conventional components such as main store, to provide data funnelling and parity checking in systems generally of the type shown in copending U.S. application of P.A.E. Gardner et al.; Ser. No. 828,503, filed May 28, 1969 now U.S. Pat. No. 3,585,605. A module comprises buses, data registers, parity checkers continuously checking data in the registers, highways whereby any register can be connected to any other register and a storage array between which array and any data register data can be transferred. Additional functions such as the selective inversion of data can be obtained with the same pin count by making the module interpretive. Such a module has a control register into which data from the array can be transferred.

In each module cycle two addresses are defined, a direct address which is explicitly given and a conditional address which is generated by an operation similar to indexing. Either address can be chosen to select from the array the control word for a cycle, the other address being used, when required for a data transfer between the registers and the array.

11 Claims, 10 Drawing Figures

CONNECT MODULES

BACKGROUND AND SUMMARY OF THE INVENTION

This invention relates to a connect module for use in electronic data processing systems.

There is available today to the circuit designer of electronic data processing systems the manufacturing technique known as large scale integration by means of which many hundreds of electronic circuits can simultaneously be manufactured on very small pieces of semiconductor material to form an electronic circuit module.

To make best use of the technique it is desirable that mass production methods be used, and this imposes on the designer the necessity of using as few differently designed modules as possible. Some success has been achieved in designing the data processing elements of an electronic data processing system so that the elements consist of only a few different designs of module but the problem remains of connecting the data processing element to the remainder of the system for example to the main store both for the transfer of information and address data. The connecting circuitry has certain functions which cannot be performed by the data processing elements. Data funnelling is frequently necessary in view of the different length data strings handled in one cycle by the processing elements and the main store respectively. Since parity checking of data while it is being processed is generally impractible, this is another function performed by the connecting circuitry before and after processing. The connecting circuitry should desirably also provide temporary data storage to enable recovery from processing element error without reference to main store and to provide space for the contents of the processing elements when they have to be cleared (dumped) in response to a system interrupt.

Since connecting circuitry has to provide such different functions it has proved difficult to design the circuitry such that large scale integration of the circuitry is possible without using many different modules.

Another problem is that of checking and repairing the connecting circuitry. Where the circuitry is complex and irregular in structure, diagnosis and repair of a fault is expensive both in time and money. The complexity of the circuitry necessitates the wasteful stocking of many different spare circuit elements and the training of maintenance engineers becomes a significant part of the cost of introducing a data processing system to the market.

All these considerations point to the desirability of providing a single circuit element from which the connecting circuitry can be built. Since there is only one design of element it can cheaply be made by large scale integration.

The connecting circuits are regular in structure and therefore easy to diagnose and repair by replacement of a faulty element or group of elements. Supply of spares is simplified, as in the training of maintenance engineers.

Such an element is referred to in this specification as a connect module.

It should be understood that the invention is not restricted to a connect module manufactured by large scale integration. Although the advantages of the connect module according to the invention make the module specially suitable for large scale integration, the ease of checking and repair make it a desirable element of connecting circuitry, however manufactured. From this aspect, the term "module" can be thought of as meaning a replaceable circuit element.

According to the invention a connect module comprises a plurality of groups of data input/output (I/O) lines, a respective I/O register connected to each group of I/O lines, parity generating circuits for generating the parity of data in the I/O registers, a plurality of data highways, and means for connecting any I/O register to any data highway whereby data can be transferred between selected I/O registers.

Preferably, but not necessarily, a connect module according to the invention also comprises a data store and means for transferring data between the store and the I/O registers.

The invention will be further explained, by way of example, with reference to the accompanying drawings, in which:

FIG. 1 is a diagram of a connect module according to the invention;

FIGS. 2*a* and 2*b* show connect modules connected in series and in parallel;

FIG. 3 shows connect modules arranged as a data funnel;

FIGS. 4 and 5 indicate the control signals used in operating the arrangement of FIG. 3;

Figure 1:
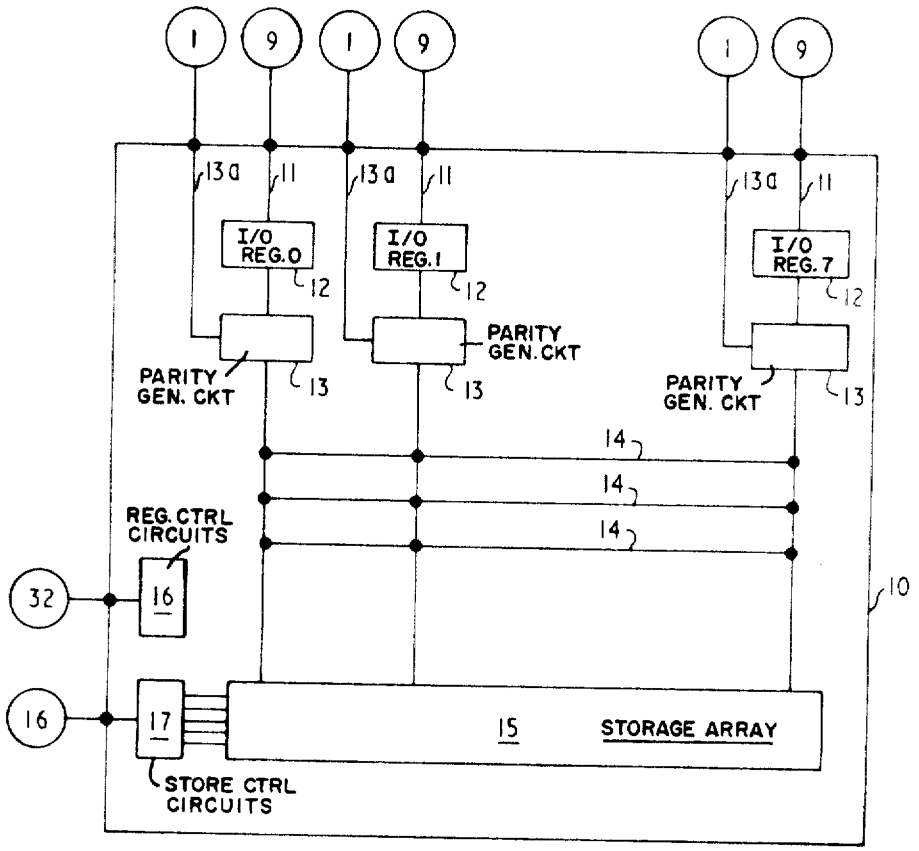

Referring to FIG. 1, a connect module 10 according to the invention comprises groups 11 of input-output (I/O) conductors, each group being connected to a respective I/O register 12. A conductor carries bit-representing signals. Hereinafter a group of conductors will be called an I/O line. In the connect module 10, it will be assumed by way of example, that there are eight I/O lines 11, each of nine conductors. Associated with each I/O register 12 is a parity generating circuit 13 which generates the parity of data in the I/O register. The nine conductors of an I/O line comprise eight data conductors and a parity conductor. A parity generating circuit 13 computes the parity of incoming data for comparison with the parity bit, and generates the parity of outgoing data, supplying the signal for the parity conductor. The connect module 10 also includes three data highways 14 to which any I/O register 12 can be connected for data transfer, and a store 15, herein called a stack, between which stack and the I/O registers 12 data transfer can take place. The stack 15 consists of a plurality of word storage locations, each location being capable of storing the signals on all the I/O lines 11. In the example being described stack 15 has five word storage locations, each of 72 bits. Bit positions 0 to 8 of a storage location are allotted to register I/O 0, bit positions 9 to 17 to I/O 2, and so on.

The module 10 is completely controlled by externally generated signals applied to terminals on the module. Since it is usual to call terminals "pins," they will be so referred to hereinafter. The number of pins associated with an element of the module is indicated in the drawings by a ringed numeral. The control circuitry for the I/O registers 12 and the highways 14 is represented in FIG. 1 by block 16 and the control circuitry for the stack 15 by the block 17. The external control signals can be generated in a suitable manner, for example by a microprogram read as a sequence of microinstructions from a control store.

The pins, including the data I/O pins, for the module 10 will now be listed, and the function associated with each pin described.

Each I/O register 12 has 14 associated pins, PO to P13, of which four are connected to the control circuitry 16, making a total of 32 I/O control pins for the circuitry 16.

Pins P0 to P7 are data pins to which the eight data bit conductors of a line 11 are respectively connected. All data entering or leaving the module by way of the connected line 11 is manifested as electric signals on these pins.

Pin P8 is the parity pin to which the parity conductor of a line 11 is connected.

Pin P9 is a second parity pin and is active when the parity of pins P0 to P8 is even. In FIG. 1 the pins P9 are represented as connected to conductors 13*a* from the parity generating circuits 13.

Pin P10 is a Read control pin.

Pin P11 is a Write control pin.

Pins P12 and P13 receive signals representing a highway 14 number. The highways 14 are numbered O1 to 11 (binary) and no signals on pins P12 and P13 mean that a highway is not to be used. The signal of pin P12 represents the lower of the binary orders.

If pin P10 is active, the I/O register 12 to which the I/O line 11 is connected is reset and the data on the line 11 is placed in the register together with the parity bit generated by the parity circuits 13. The states of pins P8 and P9 are compared and a parity error signal is emitted if they differ.

If pin P10 is active and additionally at least one of pins P12 and P13 is active, the contents of the I/O register 12 excluding the parity bit, are driven onto the highway specified by the states of pins P12 and P13.

If pin P11 is active, the contents of the I/O register 12 are driven onto the line 11. If, in addition a highway 14 is specified by signals on pins P12 and P13 the I/O register is set from the highway, good parity is generated, and the register contents are driven onto line 11.

If both pins P10 and P11 are activated, the I/O register 12 is reset to zero with good parity. If, in addition a highway is specified, after resetting, the register section receives the data on the highway with good parity. No input or output takes place over line 11.

Associated with the stack 15 and 12 stack function control pins S0 to S11. The stack controls 17 include a shift register called the stack word select register (SWSR) which has as many stages as there are word registers in the stack, each stage driving the accessing circuitry for a different word register. If a stage contains a binary one the associated word register is accessed. Any number of word registers can be accessed simultaneously causing the same data to be written from the I/O registers 12 into each accessed word register if a stack input function is executed, or if a stack output function is executed, the OR function of the data in each accessed word register to be read out to the I/O registers 12.

Pins SO to S4 receive signals indicating a binary value which can be loaded in parallel into the SWSR.

Pin S5 when active causes the current setting of the SWSR to be used in accessing the stack 15.

Pin S6 when active causes the value on pins SO to S4 to be loaded into the SWSR for use in accessing the stack 15.

Only one of pins S5 and S6 is active at a time. Neither is activated when stack function is not required.

Pin S7 is effective only when one of S5 or S6 is active. If, in this case, S7 is active a stack input function is performed, or if S7 is inactive a stack output function is performed.

Pin S8 is a Next pin and, when active, causes a single stage shift of the contents of the SWSR is a given direction.

Pin S9 is a Previous pin and, when active, causes a single stage shift of the contents of the SWSR in the direction opposite to that caused by the Next pin S8.

Pin S10, when active, indicates that a binary one has been shifted, as a result of a Next operation, out of one end of the SWSR.

Pin S11, when active, indicates that a binary one has been shifted, as a result of a Previous operation, out of the other end of the SWSR.

The Next or Previous operations can take place with or without a stack input or output function. If performed in combination with a stack function, a Next or Previous operation takes place after the stack function.

Finally, there are module control pins MO to M3 making a total of 16 pins connected to control circuitry 17.

Pin MO is the Inhibit Execute pin and if active prevents any operation from taking place in the module 10. As soon as the signal on pin MO is removed, the signals on the other pins are gated into the module and an operation is performed.

Pin M1 is the Busy pin and is active when the module is active or the Inhibit Execute pin MO is active.

Figure 2A:
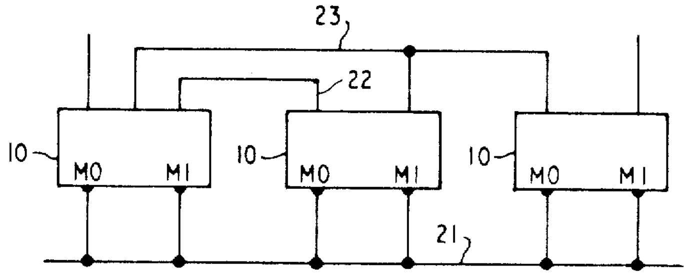

Pins MO and M1 are synchronizing pins and provide means whereby several modules 10 can be connected together. FIG. 2*a* shows parallel synchronization of three modules 10. Line 21 is connected to the pins MO and M1 of all three modules, and is at a positive level when inactive. In this state all three pins MO are activated and the modules cannot operate. When line 21 is caused to assume a negative level, synchronous operation of the modules starts. Busy signals are emitted from the pins M1 as positive levels and, in view of the feedback to the pins MO, as long as any of the modules are still operating it is impossible for a module to start a new operation. FIG. 2*a* shows connections 22, 23 between the modules to indicate the possibility of joining together the I/O lines 11.

Figure 2B:
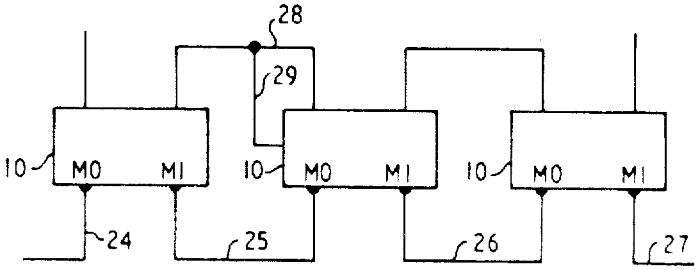

FIG. 2*b* shows how three modules 10 can be serially connected together. A line 24 provides a normally positive signal on pin MO of the first module of the series. The pin M1 of each module is connected to the pin MO of the next module of the series over lines 25, 26, respectively. The busy signal from pin M1 of the last module of the series is manifested on a line 27. The signal on line 24 is normally positive keeping the first module of the series inactive, and when this signal drops the module is enabled to perform an operation during which the signal on line 25 is positive, keeping the second module of the series inactive. The same process takes place between the second and third modules of the series. Data can be passed along the series-connected chain, as by a line 28, and, further, the output of one module can provide control signals for the next in the series. This is indicated schematically in FIG. 2b by line 29 which could be connected to the pins S of the second module of the series.

Figure 3:
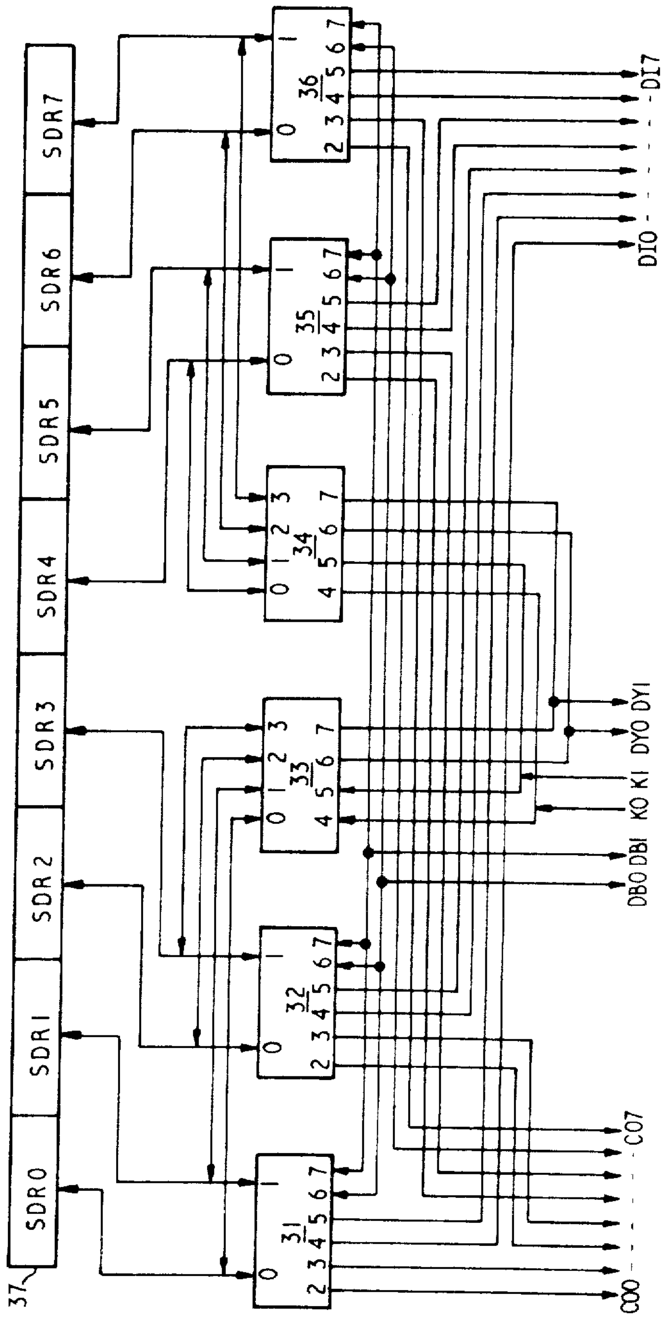

FIG. 3 shows an arrangement of six connect modules 31 to 36 which form the connect circuitry between a store data register (SDR) 37, which is the input/output register of a large data store, and the remainder of a data processing system. For the purpose of this example of the use of connect modules, it is assumed that the mainstore contains microinstructions relating to both a control program and a diagnostic program which is called in when an error is detected and which is such that the significance of the orders of the diagnostic program differs from the significance of the same orders of the control program. Diagnostic microinstructions have, therefore to be decoded differently from control microinstructions. This is called reinterpretation. The mainstore operates on 8 bytes of data each of 8 bits and the microinstructions are of 8 bytes, but the remainder of the processing system operates on only 2 byte data strings. In this example it is assumed that data can be entered into main store from a keyboard and that display lights are controlled by data from the main store.

In FIG. 3, the 8 byte positions of SDR 37 are referenced SDRO to SDR7 and the eight I/0 lines 11, each it will be recalled comprising 8 bit lines, are referenced 0 to 7 on each module 31 to 36. The external connections of the modules are as follows:

I/0 lines 0 and 1 of modules 31, 32, 35, and 36 are connected each to a different byte position of SDR 37;

I/0 lines 0 to 3 of module 33 are connected to SDRO to SDR3 respectively;

I/O lines 0 to 3 of module 34 are connected to SDR4 to SDR7;

I/O lines 2 and 3 of modules 31, 32, 35 and 36 carry the eight bytes C00 to CO7 of a control microinstruction;

I/0 lines 4 and 5 of modules 31, 32, 35 and 36 carry the 8 byte DIO to DI7 of the diagnostic microinstruction;

I/0 lines 6 of modules 31, 32, 35 and 36 are connected together and provide data byte DBO for processing by the remainder of the system;

I/0 lines 7 of modules 31, 32, 35 and 36 are connected together and provide data byte DB1 for processing by the remainder of the system;

Byte KO from the data keys is connected to I/O lines 4 of modules 33 and 34, and byte K1 is connected to I/0 lines 5 of modules 33 and 34;

Display byte DYO comes from I/0 lines 6 of modules 33 and 34, and byte DYO from I/0 lines 7 of modules 33 and 34.

Figure 4:
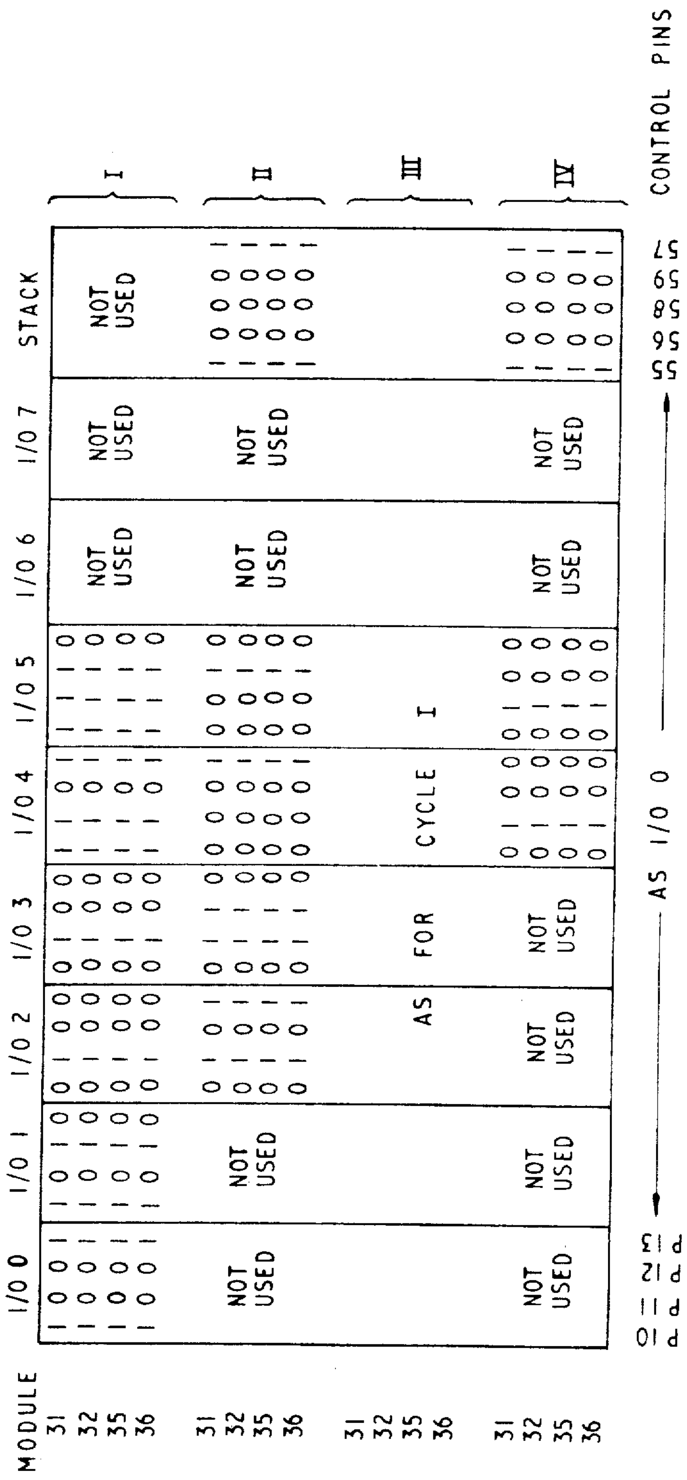

An explanation will now be given with reference to FIGS. 4 and 5 of how the arrangement of FIG. 3 can be used. FIG. 4 shows the normal control microinstruction read process, and a change to diagnostic mode when the microinstruction must be reinterpreted. Modules 33 and 34 are not used and it can be assumed that only the Inhibit Execute pin MO is active on these modules.

FIG. 4 shows the control signals applied to the pins P10 to P13 associated with each I/O line and to the pins S5 to S9 controlling the stack during 4 operating cycles I to IV of the connect modules. During cycle I the data placed on I/0 0 of modules 31, 32, 35, and 36 by the even byte positions of SDR 37 is read into the I/0 0 registers and placed on highway 01, and the data placed on the I/0 1 of the same modules by the odd byte positions of SDR 37 is read into the I/0 1 registers and placed on highway 10. The contents of the registers of I/0 2 and I/0 3 of the modules is read out to form the control microinstruction C00 to C07. As will be seen, these registers will have been loaded on the previous cycle. The register of the I/0 4 lines of all the modules are set from the I/0 0 registers by way of highways O1. This is due to the activation of both pin P10 and P11. Similarly the registers of the I/0 5 lines are set from the I/0 1 registers by way of highways 10. The result of cycle I is that the control microinstruction first read from SDR 37 is stored in the I/0 0 and I/0 1 registers of modules 31, 32, 35 and 36, and in I/0 4 and I/0 5 registers of the same modules. A microinstruction previously stored in the I/0 2 and I/0 3 registers is read out. On cycle II, registers I/0 2 and I/0 3 are set from registers I/0 4 and I/0 5 respectively, by way of highways 01 and 10 respectively, and are read out to manifest the new microinstruction. The contents of the registers are also stored in the stacks. Normally, this two cycle loop is repeated but when, as the result of detection of an error, operation changes to diagnostic mode, the contents of SDR 37 comprise a diagnostic microinstruction which must be manifested as microinstruction DI0 to D17. In this case cycle I is repeated (cycle III of FIG. 4) so that the contents of registers I/0 2 and I/0 3 continue to appear as microinstruction CO0 to CO8, while the diagnostic microinstruction is received on I/O 0 and I/O 1 and transferred to the registers of I/O 4 and I/O 5. On cycle IV the contents of registers I/O 4 and I/O 5 are read out to form the diagnostic microinstruction. The contents of the registers are stored in the stacks. During a diagnostic routine a loop similar to cycles I and II is performed but the functions of the registers of I/O 2 and 3 and I/O 4 and 5 are interchanged, i.e., the data is readout from I/0 4 and I/O 5 while being held in the registers of I/O 2 and I/O 3.

Figure 5:
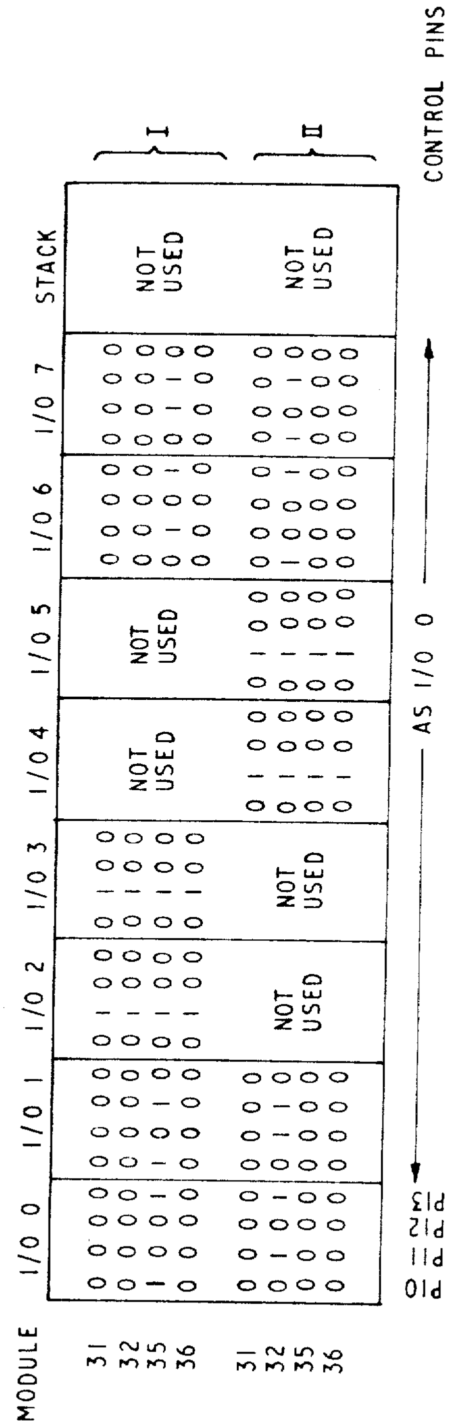

FIG. 5 shows the control signals required to use the arrangement of FIG. 3 as a data funnel. In example I, the stack and I/O 4 and I/O 5 are not used, nor are modules 33 and 34. It is required to transfer bytes SDR 4 and SDR 5 to the processing system from SDR 37. The control microinstruction currently being executed is maintained on I/O 2 and I/O 3 of modules 31, 32, 34 and 35 to provide COO to CO7. The SDR bytes are received on I/O 0 and I/O 1 of module 35 and are driven onto highways 01 and 10 respectively. The registers of I/0 6 and I/0 7 of module 35 staticize the data on the highways and manifest it on I/0 6 and I/07 and bytes DBO and DB1. Clearly the process is reversible DBO and DB1 can be staticized on the registers of I/0 6 and I/0 7 of the appropriate module and transferred to SDR 37 over I/0 0 and I/0 1 of the module. This is shown in diagnostic mode in example II, when DB0 and DB1 are to be written into SDR 2 and SDR 3 respectively. The diagnostic microinstruction is maintained on the I/0 4 and I/0 5 outputs, DBO and DB1 are written into the registers I/0 6 and I/0 7 of module 32, which then transmit the data onto highways 01 and 10 respectively. The registers of I/0 0 and I/0 1 are caused to receive the data on these highways and to place it on the I/0 0 and I/0 1 lines of module 32 which are connected to SDR2 and SDR3 respectively.

The controls connected to the control pins of the connect module 10 are implemented in conventional manner by logical circuitry and will not be particularly described. It will be understood, however, that the controls are implemented in a similar manner to the controls of further embodiments of the invention, now to be described.

Figure 6:
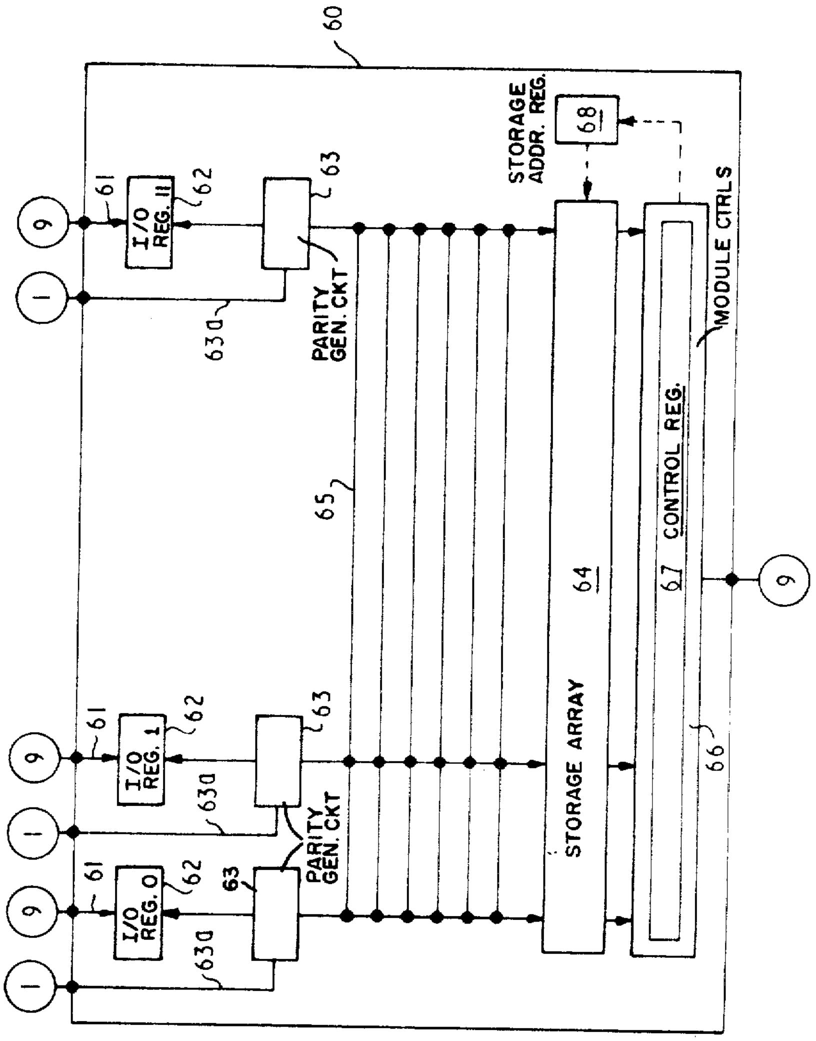
FIG. 6 is a diagram of another connect module according to the invention.

The connect module 10 of FIG. 1 is entirely externally controlled which means that a large proportion of the fixed number of pins available on a given module must be allotted to the reception of control signals and the data handling capacity of the module is undesirably low. FIG. 6 is a schematic diagram of a connect module 60 in which, with approximately the same number of pins as module 10 of FIG. 1, the number of I/0 lines, each of 9 bits, is increased to 12 and the number of highways to six. The I/0 lines 61 are connected to registers 62, to parity generating circuits 63, and to a stack 64. Lines 63*a* from circuits 63 correspond to the lines 13*a* of FIG. 1. The I/0 lines 61 are cross-connected by highways such that a path can be set up between any selected pair of I/0 lines in either direction. The characterizing feature of connect module 60 is the provision of module controls 66 comprising a module function control register 67 which supplies the control signals for operating the module. Register 67 can be, and usually is, loaded from the stack 64, but, additionally, data can be transferred from the I/0 registers 62 to register 67. Both stack 64 and control register 67 are 96 bits wide, the number of data bits on all the I/0 lines 61, and the stack can be of any desired word capacity. By way of example, stacks of capacity 16 and 256 words will be described.

The connect module operates in a three-phase cycle. During the first phase the I/0 registers 62 can be set from the I/0 lines 61 or by a word read from stack 64. In the second phase internal transfers take place by way of the highways 65 and two stack addresses are formed. One is a direct address which comes from a field of register 67. The other is a conditional address which is formed from a base address and a mask field in register 67 together with selected data from I/0 registers 62. One of the addresses will be used to read out a stack word which will control the next cycle and the other will be used to address the stack if a read or write function is called for during the next cycle. During the third phase selected I/0 registers 62 are transferred onto the I/0 lines 61 and all the registers are written into the stack 64 if a stack write is called for.

The stack 64 is a conventional word-addressable store with conventional addressing means 68 which receives address data from module controls 66 and decodes it to select one of the word positions in the stack. Such arrangements are well known and the stack 64 and addressing means 68 will not further be described.

The bit positions of the module control register are assigned the following control functions:

Bits O–59 are control bits for the I/0 registers 62. Five bits are allotted to each register. By way of example the bits allotted to I/0 0 register 62 are described.

Bit 0 : if 1, inversion is to take place on data transfer.

Bit 1 : a Read/Write control bit; if 0 and accompanied by a highway number, it specifies a Read operation in which the register accepts data from the I/0 line 61 during the first phase of a cycle and placed on the highway during the section phase; if 1 and accompanied by a highway number, it specified a Write operation in which the register will receive data from the highway during the second phase and transfer it to the I/0 line during the third phase.

Bits 2–4 : a highway number; the highways are numbered 001 to 110; the number 000 indicates that a transfer by way of a highway is not required and only a Read from or a Write onto the I/0 line is to be performed; the number 111 is interpreted as no operation on the I/0 register.

The functions of the remaining bits differ slightly in accordance with the size of the stack. They will first be described for the case in which the stack is 256 words, and after, for the case in which the stack is 16 words. The size of the stack is not critical, although 16 words seem to provide an adequate lower bound to the storage space, and any suitable size can be chosen.

256 word stack

Bits 60–67 : the direct address

Bits 68–87 : the conditional address. A base address is defined by bits 68 to 75. The base address is modified by the contents of the I/0 register defined by bits 84 to 87 which can take the values 0000 to 1011 (0 to 11 decimal), in accordance with the mask defined by bits 76 to 83. If a mask bit is 1, the conditional address bit is taken from the I/0 register. If the mask bit is zero, the conditional address bit is taken from the base address. Two examples follow:

Base address : 0100 0101 0001 1001
Mask : 1111 0000 0000 0001
I/0 reg. contents : 1110 1100 1111 1010
Conditional Address : 1110 0101 0001 1000

16 word stack

Only 4 bits are needed to address 16 words.

Bits 60–63 : the direct address.

Bits 64–76 : the conditional address. The base address is held in bits 64 to 67, the mask in bits 68 to 71 and the I/0 register number in bits 73 to 76. Bit 72 is used to indicate, if 0, that the high-order 4 bits of the I/0 register are to be used, and if 1, that the low order 4 bits are to be used.

The four low-order bits of the control register 67 are the master control field.

Bit 92 : function chaining bit. If this bit is 0, an external control signal, viz. the dropping of the inhibit execute signal, is necessary to start a module cycle. If the bit is 1, the cycle proceeds automatically thereby enabling a "microprogram" of successive cycles to be executed without external intervention, or alternatively, the module to execute the same operation until certain information is received by way of the I/0 lines.

Bit 93 : connect function address bit. If this bit is 0, the direct address is used to select the stack word to be placed in control register 67 for the next cycle. If bit 93 is 1, the conditional address is used. When a stack Read or Write function is specified, the address not indicated by bit 93 points to the stack word to be accessed.

Bit 94 : stack data read bit. If this bit is 1, the stack word addressed as explained above is placed in the I/0 registers 62.

Bit 95 : stack data write bit. If this bit is 1, the contents of the I/0 registers are written into the stack at the location addressed as explained above.

A stack Read takes place in the first phase of a module cycle before an I/0 Read and a stack Write in the third phase of a cycle after an I/0 Write. It is thus possible to specify both in the same cycle with the result that data in the stack can be modified external data in a single cycle.

Since, with a 16 word stack, not all bit positions of the control register 67 are used, one more bit can be allotted to the control of each I/0 register. In one alternative separate Read and Write bits can replace the bits corresponding to bit 1. If the Read and Write bits are both 0 there is no input to the I/0 register but it is caused to output onto a specified highway. If the Read and Write bits are both 1 there is no output from the I/0 register but it receives data from a specified highway.

In another alternative, the extra bit can be used to specify whether the contents of the I/0 register are to be used in forming a conditional address. Instead of, or in addition to addressing an I/0 register with bits 73 to 76, the setting of the extra bit to 1 causes the contents of the associated I/0 register to be or-ed with the contents of all similarly marked I/0 registers to provide the modifying part of the conditional address. The highways are not in use at the time of forming the conditional address and any highway can be used, as long as all I/0 registers are output onto the same highway.

There are seven external control pins. For synchronization an Inhibit Execute pin and a Busy pin are provided as described with reference to the connect module shown in FIG. 1. By means of these pins modules as shown in FIG. 6 can be connected together as shown in FIGS. 2*a* and 2*b*. A Reset pin is provided which, when energized, resets all the module control logic. Upon de-energization of the pin the word in stack address 000 is read out and executed. Four pins are provided initially to load the stack. The function register 67 is constructed as a shift register with a series input from a single data pin. The data to be loaded is applied to the pin in synchronism with clock signals on a Load Clocking pin. A further pin, the load pin, is activated to indicate that a load is taking place to provide the necessary control signals, and a fourth pin emits a signal to indicate that loading is completed. The technology necessary to achieve initial load is conventional and will now further be described.

Figure 7:
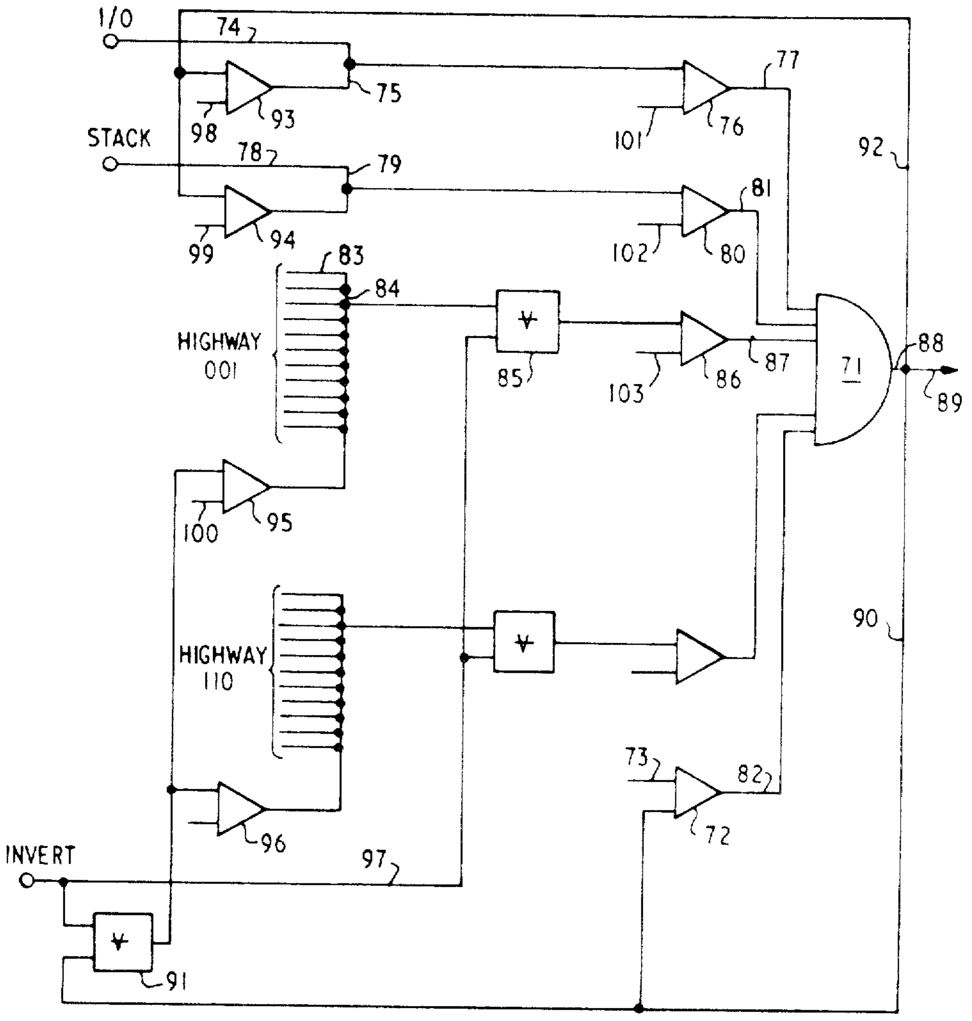
FIG. 7 is a block diagram of part of the bit control and storage circuitry of a connect module.

FIG. 7 shows one bit position of an I/0 register 62, illustrating how data is transferred between the bit position, the highways and the stack. Only two highways are shown, but it will be understood that similar circuitry is provided for the remaining four highways. The data bit is stored in a latch comprising an or circuit 72 the output of which provides one input to an and circuit 72, the output 82 of which is in turn connected as input to or circuit 71. The other input to and circuit 72 is a control line 73 which is normally active but is momentarily deactivated when it is required to write into the latch. Or circuit 71 receives inputs from several other sources. I/0 line 74 is one element of an I/0 line 61 (FIG. 6). Line 74 is connected through a dot-or junction 75 as one input to an and circuit 76, the output 77 of which is an input to or circuit 71. Connection to the stack is over line 78 which is connected to one input of an and circuit 80 over a dot-or junction 79. The output 81 of and circuit 80 is an input to or circuit 71. The other inputs to or circuit 71 come from the highways. Considering highway 001 by way of example, the highway consists of eleven lines 83 connected in a dot-or junction 84. Each line 83 is connected to a similar dot-or junction in the bit circuitry for the same order bit of each I/0 line 61 of each of the other 11 I/0 registers. Six such connections are provided, thereby defining six highways, although only two are shown in FIG. 7. The junction 84 is connected to one input of an exclusive-or circuit 85 the output of which is connected through an and circuit 86 as an input 87 to or circuit 71. The other highways are connected in similar fashion to or circuit 71. The output 88 of or circuit 71 is connected over a line 89 as an input to a parity generating circuit (not shown), over a line 90 as an input to and circuit 72, already described, and to an exclusive-or circuit 91, and over a line 92 as an input to and circuits 93 and 94. The output of exclusive-or circuit 91 provides inputs to and circuits 95 and 96. An invert control line 97 is connected as input to exclusive-or circuits 91 and 85 and the corresponding circuits in the connections of the highways to or circuit 71. In FIG. 7 the other inputs to and circuits which have not yet been described are referenced 98 to 103 respectively.

In order to read data into the I/0 register from the I/0 line, input 73 of and circuit 72 is momentarily deenergized to clear the latch and then is energized together with input 101 of and circuit 76. The data-representing signal on line 74 is thus gated to or circuit 71 over line 77 and causes lines 88, 90 and 82 to be energized in the same sense as line 74. To read the I/0 register onto the I/0 line input 98 of and circuit 93 is energized, gating the state of line 88 over line 92 and dot-or junction 75 to line 74. To transfer data between the stack and the I/0 register a similar arrangement of gates is used. If data is to be transferred from the stack input 73 is momentarily deenergized and then energized together with input 102. The signal on line 78 is thus transmitted to the latch. Transfer in the other direction across dot-or junction 79 is effected by energizing input 99 of and circuit 94.

In explaining how the highways are connected to the I/0 register, highway 001 will be used as an example. To receive data from the highway input 73 is momentarily lowered and input 103 of and circuit 86 is raised. Assuming that the invert control line 97 is not energized, the data represented by the signal levels on lines 83 is gated across the dot-or junction 84 to input 87 of or circuit 71. It will be noted that if data has been placed on the highway from more than one I/0 register the signal on line 87 is the or function of this data. If invert control line 97 is energized, exclusive-or circuit 85 operates to invert the binary signal coming to it from the junction 84. It will be recalled that an exclusive-or circuit emits one-representing output if and only if only one of its two inputs has a one-representing signal thereon. To transfer data onto the highway in true form input 100 of and circuit 95 is activated whereby the signal on line 88, which represents the data content of the latch, is gated across junction 84 to lines 83. If the data is to be transferred in inverted form invert control line 97 is energized thereby actuating exclusive-or circuit 91.

The means energization of the control outputs 73 and 95 to 103 will not be described. The inputs are effectively the outputs of a conventional decoder to which the inputs are clock signals and the data in function control register 67.

The output line 89 of or circuit 71 is connected as input to the corresponding bit position of the parity generating circuit 63.

Figure 8:
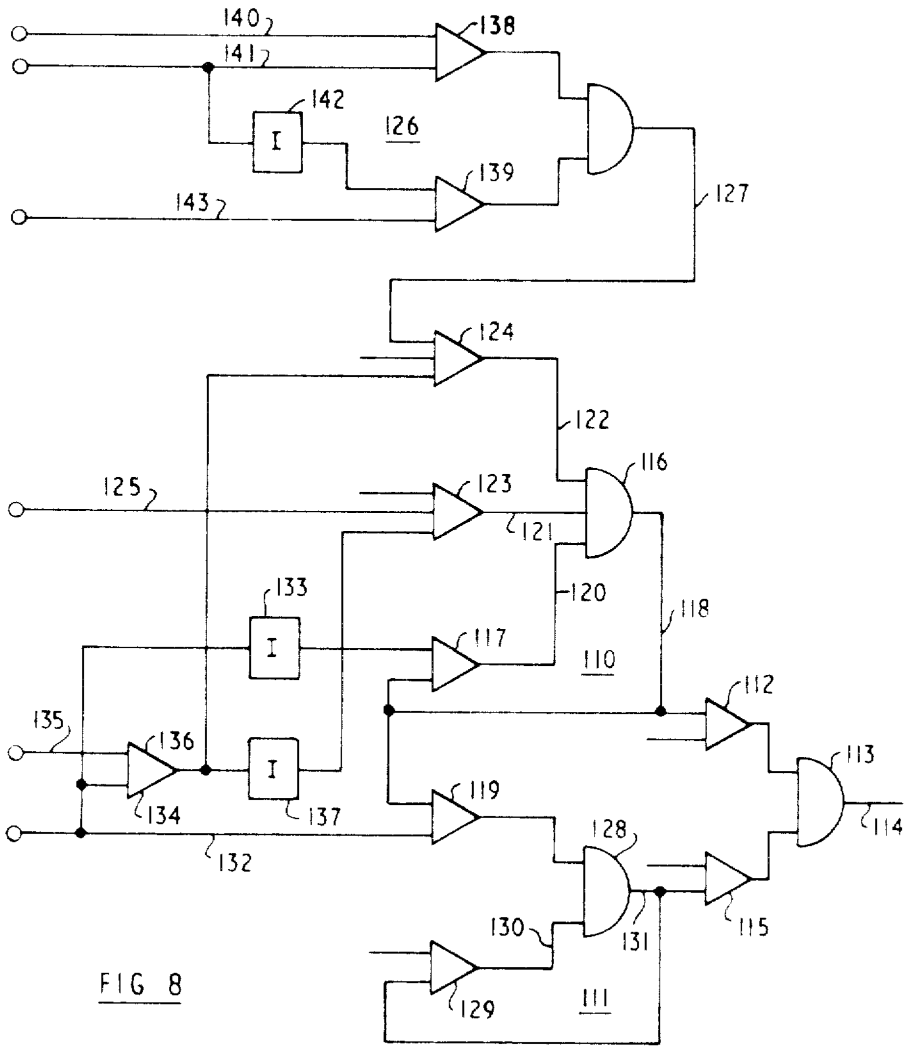
FIG. 8 is a block diagram of part of the store addressing circuitry of a connect module.

FIG. 8 shows one order of the stack address register 68 of FIG. 6. It will be remembered that the data in function register 67 defines two stack addresses, a direct address and a conditional address. In accordance with the value of a connect function address (CFA) bit one of the addresses is used to select the stack word to be read into function register 67 to control the next module cycle and the other address is used if data is to be transferred between the I/0 registers and the stack in the next cycle. The address used in selecting the word for the function register will be called the function address and the address of the location between which and the I/0 register data transfer is to take place will be called the data address.

Each order of the stack address register comprises a data address latch 110 and a function address latch 111. An and circuit 112 and or circuit 113 connects the latch 110 to an output line 114 which provides the input for the order to conventional addressing circuitry (not shown). An and circuit 115 connects latch 111 to or circuit 113 and so to output line 114. Latch 110 consists of an or circuit 116 and an and circuit 117. The output 118 of or circuit 116 is connected as an input to and circuit 117, to and circuit 112 and to an and circuit 119. The inputs to or circuit 116 are the output 120 of and circuit 117, and the outputs 121 and 122 of and circuits 123 and 124 respectively. And circuit 123 gates the direct address bit which is received from the function register over direct address line 125. And circuit 124 gates the conditional address bit which is received from conditional address generating circuitry 126 over a line 127. The function address latch 111 consists of an or circuit 128 and an and circuit 129. The output 130 of and circuit 129 provides one input to or circuit 128, while the output 131 of or circuit 128 is connected as input to and circuit 129 and also to and circuit 115. The other input to or circuit 128 is the output line of and circuit 119. A set function address latch control line 132 is connected as input to and circuit 119, through an inverter 133 as an input to and circuit 117, and also as an input to an and circuit 134. The other input of and circuit 134 is an address control line 135. The output 136 of and circuit 134 is connected as to input to and circuit 124 and, through an inverter 137 to and circuit 123. The conditional address generating circuitry 126 comprises and circuits 138 and 139. And circuit 138 has as input a conditional bit line 140 and a mask bit line 141. Line 141 is also connected through inverter 142 as input to and circuit 139. The other input to and circuit 139 is a base address line 143. The unreferenced inputs to and circuits 112, 115, 117, 123 and 124 receive clock signals at appropriate times in a connect module cycle. The clock signals are generated in conventional fashion at times determined by the following description of the operation of the circuit of FIG. 8.

The conditional address bit is formed from data on conditional bit line 140, mask bit line 141 and base bit line 143. Line 140 receives data from a given highway which is nominated as the conditional highway.

The conditional bit is transferred to line 140 from the I/0 register 61 specified by bits 83 to 87 of functional register 67 over a highway which is allotted to conditional data.

The bits on mask bit line 141 and base bit line 143 come from the function register, as explained above. If the mask bit is one and circuit 38 is enabled and the conditional bit appears on line 127. If the mask bit is zero, inverter 142 enables and circuit 139 and the base bit appears on line 127. The conditional address bit is an input to and circuit 124 while the direct address bit is an input on line 125 to and circuit 123. The choice as to which bit is to be set into the function address latch 111 is made in accordance with the signal on line 135 which is derived from bit position 93 of the function register 67. If the signal on line 135 is a one and circuit 136 is enabled and when line 132 is energized and circuit 124 is activated by the output of and circuit 136 to pass the conditional address bit on line 127 by way of line 122 or circuit 116, line 118, and circuit 119 which has also been enabled by energization of line 132, to or circuit 128 and thus into the function address latch. Notice that inverter 133 prevents activation of and circuit 117 so hat latch 110 is not operative. When the signal on line 132 drops, inverters 133 and 137 enable and circuits 123 and 117 and the direct address bit is entered into latch 110. When the signal on line 135 is zero, energization of line 132 causes the direct address bit on line 125 to be passed through latch 110 into function address latch 111. At appropriate times in a connect module cycle, first, and circuit 115 is enabled to pass the contents of latch 111 through or circuit 113 to line 114 leading to a conventional address decoder, and then, later in the cycle, and circuit 112 is enabled to pass the contents of the data address latch to the decoder.

In the embodiments of connect module so far described an attempt has been made to provide a general purpose module, i.e., a module which when wired into a circuit is capable of a wide range of operations. The drawback to this approach is that when a module is wired into a circuit it is, in general, not necessary for the module to perform some of the range of operations. If, for example, a connect module is used as a data funnel between main store and a CPU its functions will be different to those performed when it is used in a channel. Clearly many of the controls provided will not be used leading in the case of the embodiment of FIG. 1 to a wastage of pins. It is proposed to avoid the drawback by making the connect module interpretive, i.e. the connect module is so designed that control signals on given lines can be interpreted differently by modules assigned to different functions.

Figure 9:
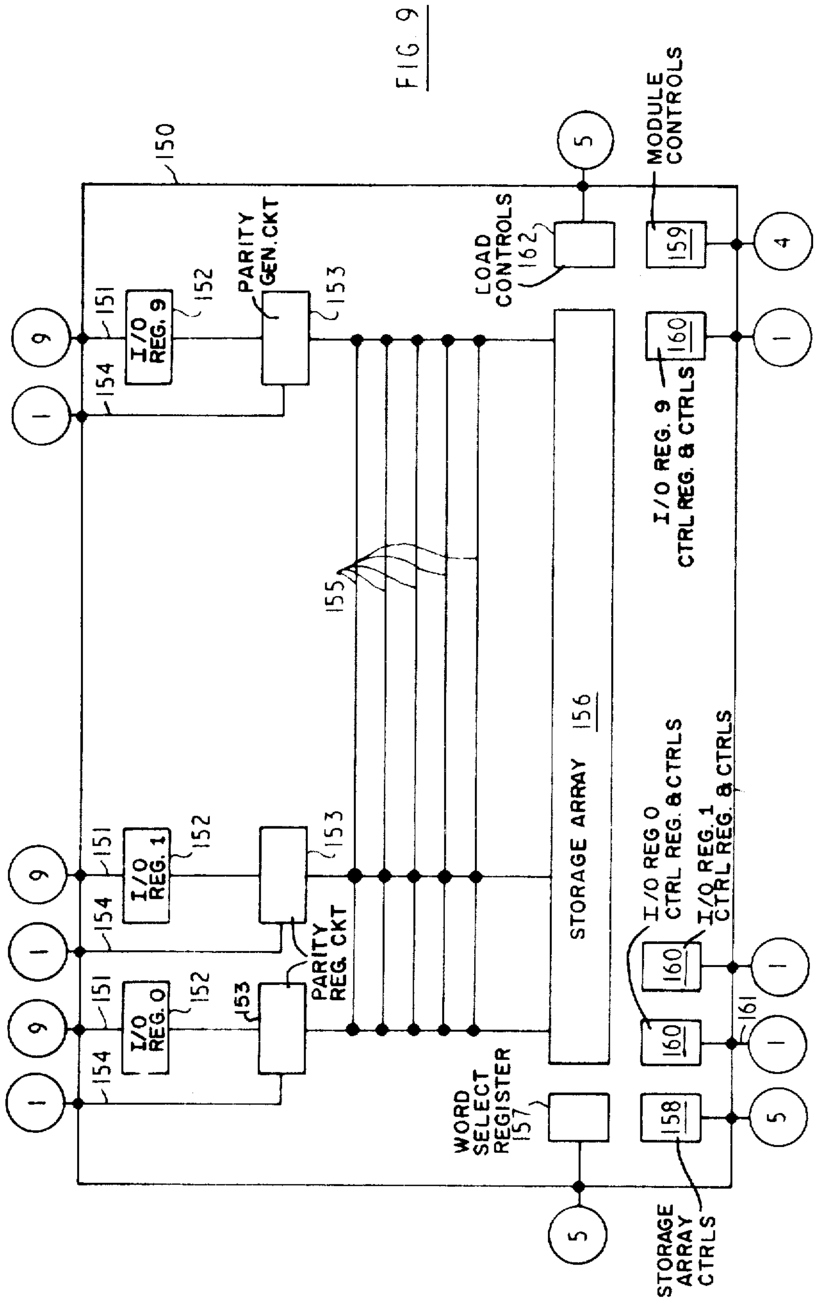
FIG. 9 is a diagram of another connect module according to the invention.

FIG. 9 shows an interpretive connect module 150 which is a modification of the module described with reference to FIG. 1. Module 150 includes 10 I/0 lines 151 connected to respective I/0 registers 152. Associated with each I/O register 152 is a parity generating circuit 153. Lines 154 from circuits 153 correspond to the lines 13*a* of FIG. 1. The I/0 registers can be connected over five highways 155 and also communicate with a storage stack 156. As in the embodiment of FIG. 1, there is a stack word select register 157, stack control circuitry 158 and module control circuitry 159. The functions of these controls are as described for FIG. 1. The major difference between the module of FIG. 9 and that of FIG. 1 is to be found in the provision of I/0 control registers 160, of which there is one to each I/0 register 152. A control register 160 contains data defining an operation or combination of operations to be performed on data in the associated I/0 register 152. Data in the control register is changeable only at initial load time and not while the connect module is in use. One control line 161 from each control register is connected to a pin on the connect module and is sampled on each module cycle. If a control line 161 is energized the operations defined by the connected control register 160 are performed on the associated I/0 register 152. If a control line 161 is not energized, no operation is performed on the associated I/0 register 152 during that cycle.

One possible arrangement of a control register 160 will now be described by way of example. A register 160 has 11 bit positions:

Bits 0 to 2 control I/0 register input functions.

Bit 0 controls resetting of the I/0 register.

Bit 1 determines if data on line 151 is to be read into the register.

Bit 2 determines if data from the stack 156 is to be read into the register.

All three controls are independent of each other so that, as an extreme case, at the end of an input phase an I/0 register could contain a superimposition of data in the register at the start of the cycle, data from line 151 and data from the stack 156.

Bits 3 to 8 control I/0 register transfer functions.

Bits 3 to 5 define a highway number in the range 001 to 101 if a highway is to be used, or are 000 if no transfer is required. Bits 6 to 8 are ignored in the latter case.

Bit 6 specifies whether transfer is to take place from or to the highway.

Bit 7 specifies whether data is to be inverted on transfer.

Bit 8 specifies whether the I/0 register, if receiving data, is to be reset before data transfer.

Bits 9 and 10 control I/0 register output functions.

Bit 9 determines if the contents of the register are to be transferred to the I/O line 151.

Bit 10 determines if the contents of the register are to be written into the stack.

The three groups of functions are arranged to take place during the three phases of a module cycle.

Loading of the control registers 160 can conveniently be done by the technique outlined above for the function register 67 of FIG. 6. The registers 160 are connected serially as a shift register and data is loaded under the control of load control circuitry 162 (FIG. 9) as previously described. In FIG. 9 the number of pins associated with each element of the module have been illustrated in the drawing as a circled numeral. Since fewer pins are required to control the I/0 registers the number of I/0 lines 151 have been increased from 8 in the embodiment of FIG. 1 to 10 in the FIG. 9 embodiment and the number of highways from 3 to 5, for a module with the same number of pins.

In an alternative embodiment, three control registers 160 can be provided for each I/O register with a different set of operations defined by each register. Control is by means of binary signals on two lines 161. If the input signals are both zero, no operation is called for. If the signals are non-zero, in accordance with the represented value one of the control registers 160 is selected for the current module cycle.

The interpretive principle can also be applied to the internally controlled connect module shown in FIG. 6. The module is constructed as described with reference to FIG. 6 with the addition of six I/O control registers identical to the registers 160 described with reference to FIG. 9, save that the external control line 161 is omitted. Assume that the interpretive connect module has a stack of 16 words. The function control register has 96 bit positions. Control of the module and of the stack is as described previously but there is also provided in the function control register two 12 bit I/O control fields. The interpretation of the bit positions in these control fields is as described for the control registers 160. Each I/O register has four bit positions, bits 0 to 3, allotted to its control. Bit 0 is the interpret control bit. If bit 0 is zero, bits 1 to 4 exercise direct control over the I/O register. Bit 1 specifies read or write, and bits 2 and 3 specify a highway to be used in data transfer. As before, if bits 2 and 3 are both zero no data transfer takes place. Although only three highways can be selected from and there is no invert control, there is sufficient choice in this simple control arrangement for many purposes. If bit 0 is one, bits 1 to 3 specify where the control bits for the I/O register are to be found. If the bits are 000 then one of the control fields in the function register is used and if the bits are 001 the other of the control fields is used. If the bits take one of the values 010 to 111, they specify one of the six I/0 control registers. This arrangement provides that at any time six predetermined operations are available to any I/0 register and that during any cycle two extra operations, particular to that cycle, are available.

An important feature of all the connect modules described is the parity checking facility. Any suitable parity generating circuitry can be used but it is preferred to use the circuit described with reference to FIG. 6 of the specification of our copending U. S. application of Flinders, et al., Ser. No. 28,900, filed Apr. 4, 1970. said application is hereby incorporated by reference as if it were set forth herein in its entirety. In that circuit, parity is represented by current flowing in one of two lines. The circuit has one stage for each order of which the parity is being checked and the lines pass through all stages of the circuit. If an order is a binary one the current is switched from the line in which it was flowing on entering the stage corresponding to the order to the other line. If an order is binary zero current flow is not switched. To generate an odd parity, assuming that current flow in a first of the lines represents a parity of one, a current generator supplies current to the first line. If the number of ones in the orders being checked is even, on leaving the last stage the first line will carry current, representing a parity bit of one. Otherwise the other line will be carrying current representing a parity bit of zero. The circuit can readily be adapted to generate the even parity bit for the lines 14*a* of FIG. 1 for example.

What is claimed is:

1. A connect module carried by a single mounting structure and comprising a plurality of groups of ordered data input-output (I/0) conductors, a respective I/0 register having its input connected to each group of I/0 conductors, a parity generating circuit connected to each I/0 register for generating a parity check bit for data stored in the respective I/0 register, a plurality of data highways, means for connecting any I/0 register to any data highway whereby data can be transferred between selected I/0 registers, and means coupling data from each I/0 register and a parity check bit from the corresponding parity generating circuit to the corresponding group of I/0 conductors.

2. A module as claimed in claim 1, comprising a data store, and means for transferring data between the store and the I/0 registers.

3. A module as claimed in claim 2 further comprising control circuits on the module for controlling the connections between the highways, the I/0 registers and the data store, and said control circuits arranged to be externally controlled by the application of control signals to terminals thereof.

4. A module as claimed in claim 2, including control registers arranged in operation to receive externally applied control data, and control circuits responsive to said control data in the control registers for transferring data to and from the I/0 registers.

5. A module as claimed in claim 2 including a function control register, means for transferring data to the function register from the store, and means including the function register for controlling interconnections between the highways, the I/0 registers and the data stores in accordance with the data.

6. A connect module as claimed in claim 3, wherein the control circuits include control registers each arranged in operation to receive externally applied data for controlling an I/0 register.

7. A connect module as claimed in claim 5, wherein the function control register contains data groups each for controlling an I/0 register, said module including means responsive to other data in the function control register for selecting a data group.

8. A module as claimed in claim 5, wherein the store comprises a plurality of storage locations each identified by an address, wherein the function control register and a selected I/O register are arranged to receive data defining a conditional store address, wherein the function control register is arranged to receive data representing a direct store address, said module further comprising means responsive alternatively to the direct address or the conditional address for accessing data in the store for transfer to the function control register.

9. A module as claimed in claim 1 further comprising means including the parity generating circuits for verifying the parity of data supplied to the I/O registers by way of the I/O conductors.

10. In a data processing system of the type having means for storing a plurality of different classes of data and bus means connected to outputs of the storing means for transferring each class of data to different utilization means, said bus means comprising a plurality of I/0 conductor groups connected to respective outputs of the storing means, and a plurality of connect modules each carried by a single mounting structure, each module including a plurality of groups of ordered data input-output (I/0) terminals, one of the groups of I/0 terminals being coupled to a respective one of the I/0 conductor groups, another one of the groups of I/0 terminals being coupled to a respective utilization means, a respective I/0 register for each group of I/0 terminals and having an input and an output, means for coupling the register input and output to the respective group of I/0 terminals, a plurality of data highways, and means for connecting any I/0 register input and any I/0 register output to any data highway whereby data can be transferred between selected I/0 registers for transfer to selected utilization means.

11. The combination of claim 10 further comprising a parity generating circuit connected to each I/0 register for generating a parity check bit for data transferred to and from the respective I/0 register, and means including the parity generating circuits for verifying the parity of data supplied to the I/0 registers by way of the I/0 conductors.

* * * * *